March 13, 1956 — S. SAITO ET AL — 2,738,432
METERLESS RADIAC SURVEY INSTRUMENT
Filed Jan. 9, 1953 — 3 Sheets-Sheet 1

INVENTORS
SACHIO SAITO
SAUL R. GILFORD

BY B. L. Zangwill
ATTORNEYS

March 13, 1956 S. SAITO ET AL 2,738,432
METERLESS RADIAC SURVEY INSTRUMENT
Filed Jan. 9, 1953 3 Sheets-Sheet 2

INVENTORS
SACHIO SAITO
SAUL R. GILFORD

BY B. L. Zangwill
ATTORNEYS

March 13, 1956  S. SAITO ET AL  2,738,432
METERLESS RADIAC SURVEY INSTRUMENT
Filed Jan. 9, 1953  3 Sheets-Sheet 3
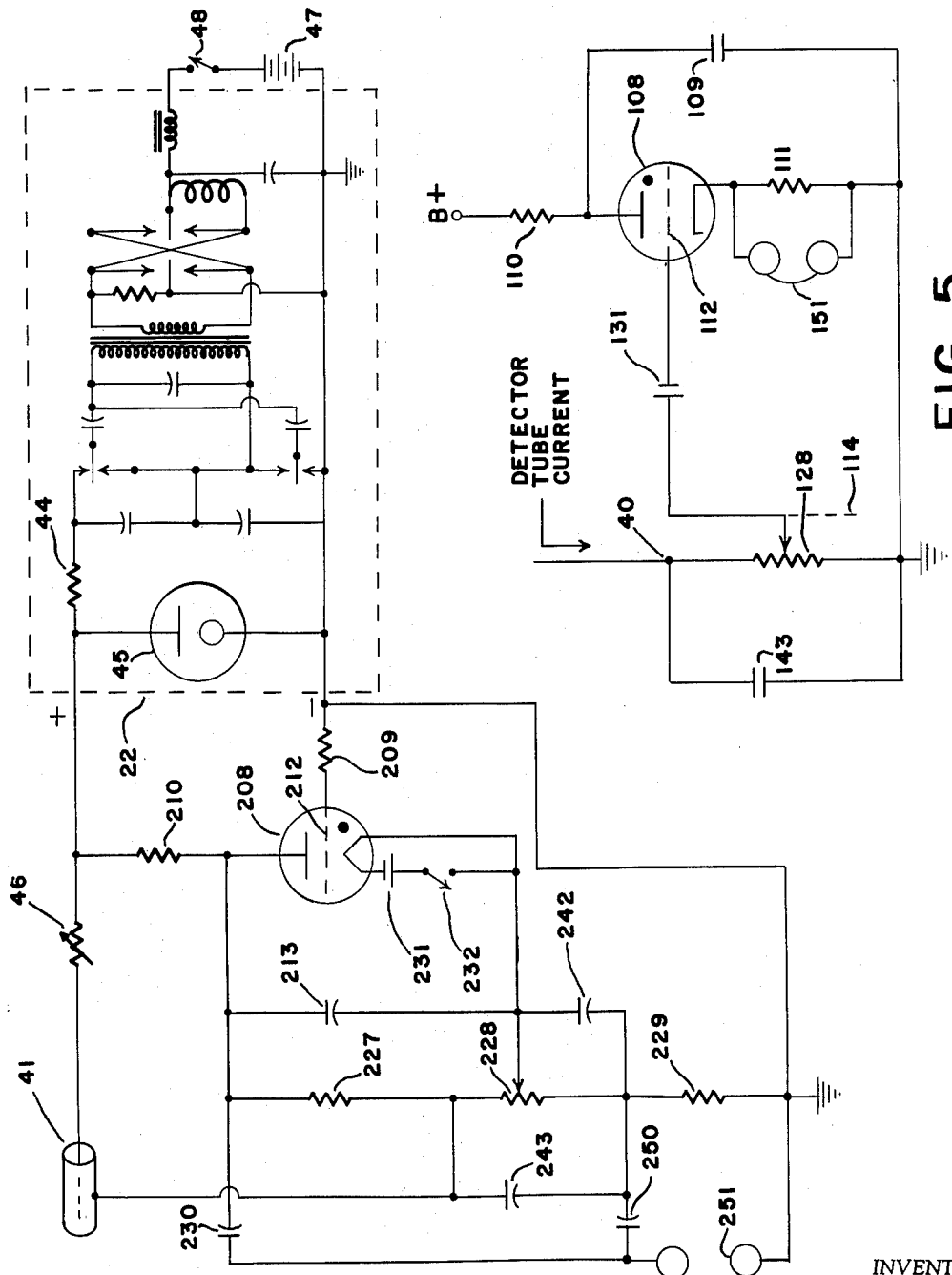
FIG. 5
FIG. 6
INVENTORS
SACHIO SAITO
SAUL R. GILFORD
BY 
ATTORNEYS United States Patent Office 2,738,432
Patented Mar. 13, 1956

2,738,432

METERLESS RADIAC SURVEY INSTRUMENT

Sachio Saito, Chevy Chase, and Saul R. Gilford, Silver Spring, Md., assignors to the United States of America as represented by the Secretary of the Navy Application January 9, 1953, Serial No. 330,601

11 Claims. (Cl. 250—83.6)

(Granted under Title 35, U. S. Code (1952), sec. 266)

The invention described herein may be manufactured and used by or for the Government of the United States for governmental purposes without the payment of any royalties thereon or therefor.

The present invention relates to radiation detector instruments and more particularly to an instrument for surveying areas for the extent and level of radioactivity.

In general instruments of this type have in the past used a Geiger-Mueller tube as a radiation detector with a microammeter to measure the current flow through the tube and hence the effective amount of radiation. It is desirable, for defense purposes, to have an instrument of this type which is easy to use and is available in large quantities. The instrument should be of rugged construction, complete and self-contained and capable of mass production at a minimum cost. It is apparent that the microammeter used in the prior art fails to meet these requirements. It is a sensitive, delicate instrument requiring care in handling. It is not capable of mass production and its cost of production is high.

It is accordingly an object of the present invention to produce a radiation detector that is rugged and simply construction, that does not use any sensitive or expensive parts, that is easy to use, that is small and portable, and that can be produced in quantity at low cost and with satisfactory uniformity.

It is a still further object of the invention to provide a self-contained portable radiation detector complete with its required power supply.

It is a further object of the invention to provide a radiation detector capable of aural indication of the radiation level.

In accordance with the invention, an instrument is provided that is somewhat similar in construction to a flashlight, having a head that contains a circuit and elements therefor which are especially arranged therein for minimum physical size and maximum ruggedness. In furtherance of this objective a simplified circuit is provided which, in general, makes use of a potentiometric null voltage detector for measuring the output of the Geiger-Mueller detector tube of the instrument.

Other objects and many attendant advantages of this invention will be readily appreciated as the same becomes better understood by reference to the following detailed description when considered in connection with the accompanying drawings wherein:

Fig. 5 is a wiring diagram of another embodiment of such a circuit; and

Fig. 6 is a wiring diagram of still another embodiment.

Figure 2:
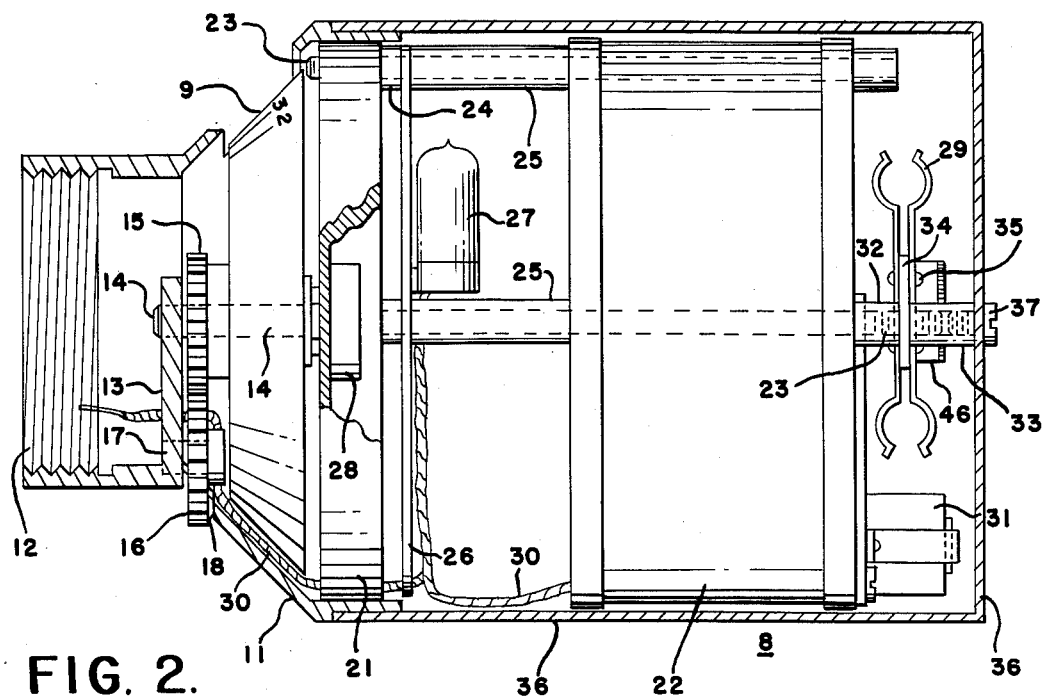
Fig. 2 is a side view, partially in section, of the head shown in Fig. 1.
Figure 1:
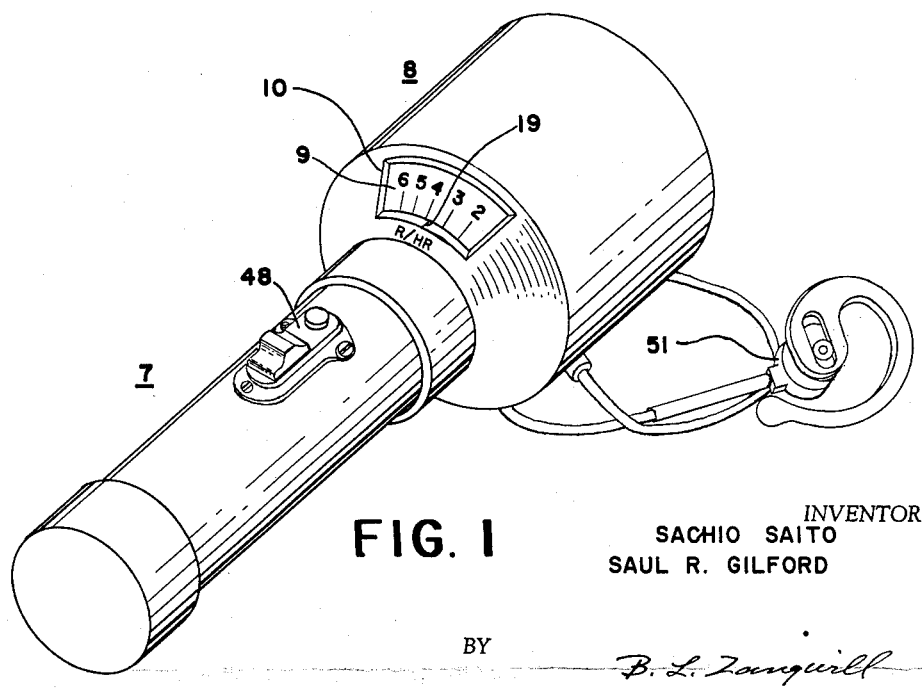
Fig. 1 is a perspective view of the overall device according to this invention including a conventional battery case of the flashlight type and a head containing the detector and various circuit elements.
Figure 3:
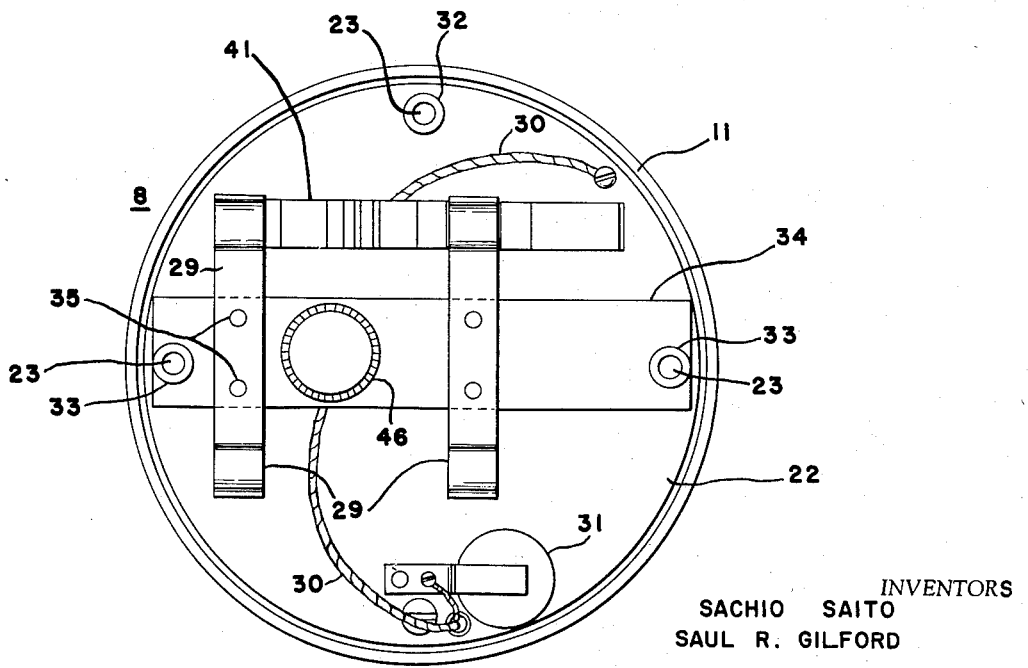
Fig. 3 is a front end view of the head of Fig. 2 with cover plate removed.

The physical structure of the radiation detector may be understood by reference to Figs. 1, 2 and 3 of the drawings. In Fig. 1 the overall structure is made up of a body 7 which is a flashlight casing enclosing flashlight batteries in a conventional manner, and a head 8 which carries electrical circuit components and an indicator dial 9. The body 7 can be held in the hand of an operator with the indicator 9 clearly visible to him.

The construction of the head 8 is more clearly shown in Figs. 2 and 3. The head comprises an outer round metal shell 11 having a cylindrical front portion and a reduced end at its rear, in the form of a threaded fitting 12 that screws on body 7. A bracket 13 at the front of the reduced fitting 11 rotatably supports one end of a potentiometer shaft 14 the other end of which is rotatably supported in the housing of a potentiometer 28 carried by the head in a manner subsequently described. A pinion gear 15 is fixed to shaft 14 and this pinion in turn engages a second pinion gear 16 rotatably carried on a stub shaft or pivot 17 mounted in the lower portion of the bracket 13. The teeth of pinion gear 16 protrude slightly through a slot 18 in the shell 11 just to the right of the bracket 13 as shown in Fig. 2. The portion of gear 16 protruding through slot 18 permits rotational adjustment of the shaft 14 by a finger of the operator. The indicator dial 9 is also fixed on the potentiometer shaft, so as to rotate with the shaft. The dial 9 cooperates with an index mark 19 on the exterior of the shell 11 and is visible through a slot in the shell to indicate the setting of the potentiometer shaft 14.

The pinion gear 15, shaft 14, and indicator dial 9, and the potentiometer 28 form an assembly carried by a mounting frame. This frame is made up of a mounting pan or support ring 21, a power supply case 22 and three through bolts 23, each bolt having spacers 24 and 25 to position the ring 21 and case 22 with respect to one another, and also to hold a circuit plate 26 of insulating material between the spacers 24 and 25 but in spaced relation to the ring and case. The support ring 21 carries the potentiometer 28 and is shown partly broken away in the drawing in order that the manner of mounting will be clearly evident.

The circuit plate 26 serves as a mounting for various circuit components such as, for example, the electronic tube 27 shown on the plate. Printed circuit techniques, now well known in the art, may be used to apply circuit elements to the plate 26. Connections between circuit elements carried by the plate 26, the power supply, the batteries, the Geiger-Mueller tube, etc. may be made by cables 30 visible in Figs. 2 and 3.

The power supply case 22 serves as a mounting plate for clips 29 and other components such as a mercury cell 31. Spacer nuts 32 and 33 are used on a pair of diametrically opposite through bolts 23 to hold an insulating plate 34 to which the clips 29 are secured by suitable means, such as rivets 35. The clips 29 serve as mounts for the Geiger-Mueller tube 41 used as a radiation detector. It will be noted that the clips are designed to accommodate two Geiger-Mueller tubes. The range of the instrument may be increased by adding a second tube, which when mounted is connected in parallel with the first tube.

Spacer nuts 33 also are used to secure the cover 36 of the head 8 by means of cap screws 37. The cover 36 is pervious to radioactivity, and may be aluminum.

The electrical circuits used in the present case are preferably of the potentiometric null type. The Geiger-Mueller detector tube is connected in series with a fixed impedance across an appropriate source of voltage. When the Geiger-Mueller tube is exposed to a source of radiation the current through the series circuit and hence the voltage drop across the impedance will vary in accordance with the level of radiation falling on the tube. The magnitude of the voltage is a measure of the strength of radiation to which the Geiger-Mueller tube is subjected. This voltage has been measured in the instant case by comparison with a known voltage to determine its magnitude.

Figure 4:
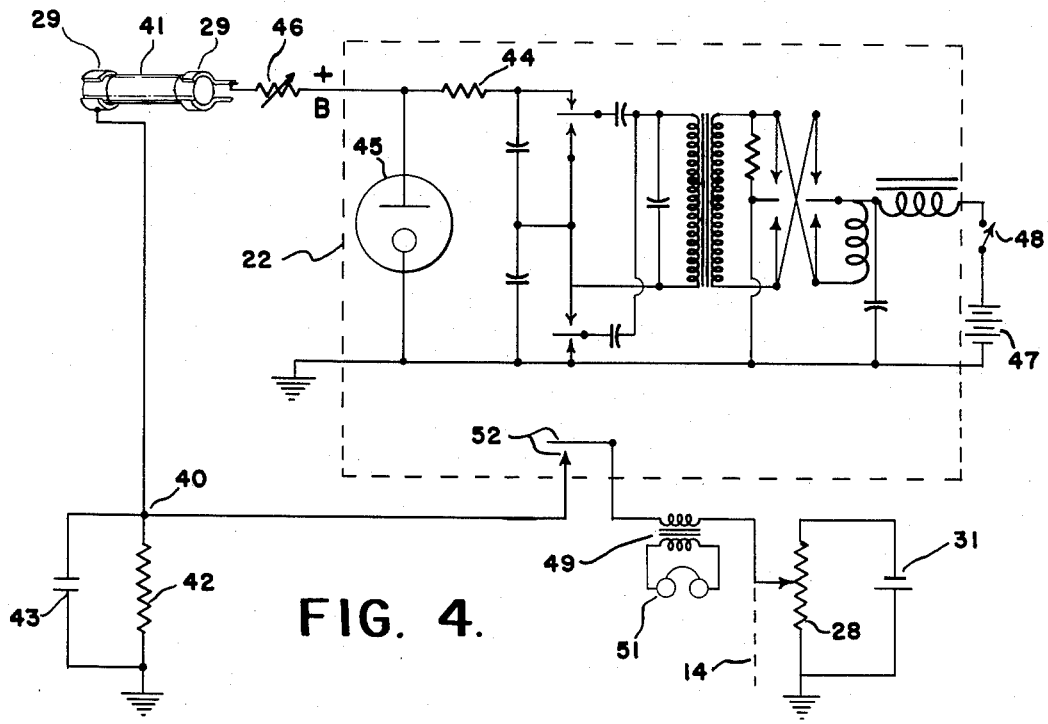
Fig. 4 is a wiring diagram of one embodiment of a circuit utilized in the invention.

The circuit shown in Fig. 4 shows one system by which such measurement is accomplished.

A Geiger-Mueller tube 41, which may be of the halogen filled 700 volt Navy type BS2, is connected in series with a fixed resistance 42 across a suitable high voltage source such as that shown in the case 22. This source is a conventional synchronous vibrator power supply, such as the Eltron Model 103D-6, modified by the addition of a resistance 44 and a voltage regulator tube 45. Such a vibrator power supply for converting low voltage D. C. to high voltage D. C. is well known. It usually consists of a transformer the primary circuit of which is fed from the low voltage source through interrupter contacts, while synchronously operating contacts between the transformer secondary and the load serve to rectify the high voltage pulses produced in the secondary winding. The voltage regulator tube 45 may be a corona voltage regulator tube such as the Victorean 5,950 700 volt type. An adjustable resistance 46 is included in the series circuit across the power supply source to allow for initial adjustment of the circuit. An integrating condenser 43 is connected across the fixed resistance 42. The function of this condenser will be explained later. The power input to the power supply in case 22 is taken from battery 47, which may consist of a pair of type "D" flashlight cells in series in the flashlight body 7, under control of a switch 48 of the flashlight body 7.

An additional pair of chopper or interrupter contacts 52 over and above those required for the synchronous vibrator power supply operation is included in the power supply case. These contacts are opened and closed intermittently by the vibrator armature. The purpose of these contacts will be explained later.

A source of standard voltage, which may be the mercury cell 31, is connected across the potentiometer 28 and the movable tap of the potentiometer, operated by the shaft 14, and the upper end of resistance 42 are connected through the chopper contacts 52 and the primary of a matching transformer 49. A pair of headphones 51 is connected across the secondary of matching transformer 49. The transformer is inserted for impedance matching purposes and may be omitted if desired, the headphones then being connected directly in the circuit in the place of the transformer primary.

The operation of the circuit of Fig. 4 will now be described.

Assume that the switch 48 is closed and that the power supply in the case 22 is applying its voltage to the Geiger-Mueller detector circuit. The average magnitude of current-flow through the Geiger-Mueller tube 41 and the resistance 42 will be determined by the level of radiation to which the detector tube is exposed. This current will increase as the radiation level increases. This current produces a voltage drop across fixed resistance 42 which is proportional to the radiation level. Due to the characteristics of the Geiger-Mueller tube and its response to radiation levels this current will be in the form of pulses. Condenser 43 is therefore connected across resistance 42 to smooth or integrate the voltage developed across the resistance. The voltage across the portion of potentiometer 28 below the tap is of the same polarity as that produced across resistance 42. These two D. C. voltage sources are opposed through the connection including the primary of transformer 49 and the chopper contacts 52. If the voltages are not of equal magnitude a resulting current will flow in the above connection. This circuit connection is intermittently broken at the rate of operation of contacts 52. The interrupted current flow in the circuit will produce an audio note in the phones. The operator may now rotate shaft 14 of the potentiometer 28 until the voltage across the portion is equal to that across resistance 42. In other words a null is obtained. No current flows in the connecting circuit which is indicated by the lack of the audible note in the headphones 51.

Potentiometer shaft 14, it will be remembered, has indicator dial 9 affixed thereto. The potentiometer shaft has been rotated to null the voltage across resistance 42. Since this voltage is in turn proportional to the radiation level the magnitude of the radiation level may now be directly read from indicator dial 9. Indicator dial 9 may be calibrated to read directly in any suitable units to indicate the radiation level present where the instrument is used.

Another form of null detection circuit is shown in Fig. 5. This circuit consists of a gaseous discharge tube connected as a relaxation oscillator. Fig. 5 is a fragmentary view showing only such elements as are necessary to an understanding of the modification.

A calibrated potentiometer 128, similar to potentiometer 28 in the modification of Fig. 4, is connected to terminal 40 which is the same point in the circuit given this reference character in Fig. 4. The current flow through the Geiger-Mueller tube flows through potentiometer 128 and the voltage produced by this current is integrated by condenser 143. As in the modification of Fig. 4, therefore, a voltage is developed across an impedance, which in this case is potentiometer 128, that is proportional to the radiation level. A portion of this voltage is tapped off by the potentiometer slider and is applied through bias battery 131 to the grid 112 of a thyratron 108. The potentiometer applies a positive voltage to the grid which is opposed by a negative voltage from the bias battery 131. Thyratron 108 is connected to a suitable source of plate potential through the plate resistance 110 and cathode resistance 111. A condenser 109 is connected between the plate of the thyratron and ground. Phones 151 are connected across the cathode resistance 111.

It will be apparent that thyratron circuit described will oscillate if the potential on grid 112 exceeds the critical potential of the thyratron. Below this voltage the system will not oscillate. The transition point between oscillation and non-oscillation is used as the null point of this system. Assume that the Geiger-Mueller tube is exposed to a high level of radiation and the voltage across the potentiometer 128 to be correspondingly high. The circuit will be in oscillation as may be determined by an audible note in the phones. The operator reduces the portion of the potentiometer grid voltage applied to the grid circuit by turning the shaft 114 of the calibrated potentiometer 128. When the circuit ceases to oscillate the grid potential has been reduced below the critical level. At this threshold level where the circuit just ceases oscillation the value of radiation level may be read from the calibrated scale of the potentiometer. The operation is seen to be similar to that described in the arrangement of Fig. 4.

Chopper contacts such as 52 of Fig. 4 are not used in the modification of Fig. 5.

A third modification of the invention is shown in Fig. 6. In this embodiment the power supply in case 22 is the same as that shown previously in Fig. 4. The Geiger-Mueller tube 41 is connected to the positive terminal of the supply through variable resistance 46. A series circuit to the negative or grounded terminal of the supply is completed through calibrated potentiometer 228 and fixed resistance 229. Condensers 242 and 243 serve to integrate the voltage drop across potentiometer 228. The plate supply voltage of thyratron 208, which may be of the type RK-61, is obtained across resistance 227 and the upper portion of potentiometer 228 connected in series with resistances 210 and 229 across the high voltage source to form a voltage divider. The grid 212 of the thyratron 208 is connected to ground through resistance 209. The thyratron cathode is of the directly heated type energized by a source such as battery 231 through a switch 232. This battery may be a 1.2 volt mercury cell such as the Mallory type RM-1. Such a cell is shown in Fig. 2 at 31.

In this modification, the thyratron 208 together with resistance 210 and condenser 213 constitute a relaxation oscillator circuit. The grid being grounded the voltage on the cathode resistor including a portion of potentiometer 228 and resistance 229 determines the grid voltage on the thyratron. The current flow through these elements is proportional to the radiation level to which the Geiger-Mueller tube is exposed. As in the modification of Fig. 5 the calibrated potentiometer 228 is adjusted until the grid voltage is such that the oscillator circuit just begins to go into oscillation. This is determined by means of headphones 251 which are coupled to the thyratron plate by means of a condenser 230. The radiation level may then be read from the calibrated dial indicator on the shaft of potentiometer 228.

As previously explained the output of the Geiger-Mueller tube is in the form of pulses. It may be desirable to directly monitor the output of the Geiger-Mueller circuit as in a case where the output is too low to be metered. Headphones 251 are accordingly further coupled by condenser 250 directly across resistance 229. Since resistance 229 is in the Geiger-Mueller tube circuit and is not by-passed by an integrating condenser the pulsed output may be monitored directly.

The electrical modifications presented above in Figs. 4, 5 and 6 all may be contained in the mechanical structure shown in Figs. 1, 2 and 3.

The device as shown in Figs. 5 and 6 is also usable to survey a given area to determine if the radiation level is above a particular given quantity. The operator in such procedure sets the calibrated potentiometer to the predetermined level. The area is then investigated with the potentiometer remaining in this position. If no audible note is obtained in the phones the radiation level in the area is below that set on the calibrated potentiometer. Radiation levels equal to or in excess of the predetermined level will cause the thyratron relaxation oscillator to produce an audible indication.

The systems disclosed above represent radiation detectors of simple and rugged construction. They are adaptable to mass production techniques and involve no critical parts requiring expensive and difficult manufacturing methods. The measuring method, while involving an indirect comparison, does not require a highly skilled operator.

Obviously many modifications and variations of the present invention are possible in the light of the above teachings. It is therefore to be understood that within the scope of the appended claims the invention may be practiced otherewise than as specifically described.

What is claimed is:

1. A radiation level detector comprising a tube containing electrical batteries, an enlarged head on one end of said tube, said head containing a calibrated potentiometer, a vibrator power supply, a thyratron relaxation oscillator circuit, a Geiger-Mueller detector mounted in the head at the end remote from said tube, a circuit for said Geiger-Mueller detector and a circuit producing a standard voltage, means connecting the input of said power supply to said batteries, means connecting the Geiger-Mueller detector circuit, the standard voltage circuit and the relaxation oscillator circuit to the output of said power supply, means including said calibrated potentiometer connecting the voltages developed in said Geiger-Mueller detector circuit and said standard voltage producing circuit to the cathode-grid circuit of said thyratron and electrical indicating means coupled to the output of said relaxation oscillator and said Geiger-Mueller detector circuit.

2. In a radiation level detector, a tube adapted to contain electrical batteries, a head mounted on one end of said tube, said head comprising a generally cylindrical casing of larger diameter than said tube, a support ring adjacent one end of said casing, a calibrated potentiometer mounted in said support ring, an indicator dial on the shaft of said potentiometer cooperating with an index mark on said casing to indicate the potentiometer setting, manual means to adjust the potentiometer setting extending through the side of said casing, a circuit plate mounted transversely of said casing and spaced along the longitudinal axis of said casing from said support ring, a power supply case transversely mounted in said casing and longitudinally displaced from said circuit plate and a detector tube mount and a battery mount on the end of said power supply case remote from said circuit plate.

3. In a radiation level detector, a tube adapted to contain electrical batteries, a head mounted on one end of said tube, said head comprising a generally cylindrical casing of larger diameter than said tube, a support ring adjacent one end of said casing, a calibrated potentiometer mounted in said support ring, an indicator dial on the shaft of said potentiometer co-operating with an index mark to indicate the potentiometer setting, a power supply case transversely mounted in said casing and longitudinally displaced from said support ring and a detector tube mount on the end of said power supply case remote from said support ring.

4. A radiant energy level detector comprising, a detector element, an electrical characteristic of which is altered in response to radiant energy, a calibrated potentiometer having input and output terminals, a resistance element, a condenser, a grid controlled thyratron tube, a source of voltage, a first circuit connected across said source of voltage and including said detector element and the input terminals of said calibrated potentiometer, a second circuit connected across said source of voltage including said resistance element and said condenser in series, with said condenser shunted by the anode-cathode circuit of said thyratron, means connecting the output terminals of said potentiometer in the cathode-grid circuit of said thyratron, and oscillation detection means coupled between the anode of said thyratron and one side of said voltage source.

5. A radiant energy level detector comprising, a regulated direct current power current power supply, a Geiger-Mueller detector tube, a calibrated potentiometer having input and output terminals, first and second resistance elements, a condenser and an aural detector means, a first series circuit including said Geiger-Mueller detector tube, said calibrated potentiometer input terminals and said first resistance element connected across said power supply, a second series circuit including said second resistance element, said condenser, said potentiometer output terminals and said first resistance connected across said power supply, means to connect the anode cathode circuit of said thyratron in shunt to said condenser, means to connect the grid of said thyratron to the negative terminal of said power supply, means connecting one terminal of said aural detecting means to the negative terminal of the power supply and electrical coupling means connecting the other terminal of the aural detecting means to the anode of the thyratron and to the junction between the calibrated potentiometer and the first resistance element.

6. A radiation level detector comprising a Geiger-Mueller detector tube circuit adapted to produce a voltage responsive to radiation intensity falling on said detector tube, a relaxation oscillator circuit including a grid controlled thyratron tube, means to produce a standard source of voltage, circuit means to supply the voltage produced in the detector tube circuit and said standard voltage to the cathode-grid circuit of said thyratron tube, and indicator means responsive to the output of said oscillator circuit, said voltage producing means, including calibrated adjusting means to vary the magnitude of at least one of said voltages to obtain a null condition.

7. A radiation level detector according to claim 6 wherein the magnitude of the combined voltages in the cathode-grid circuit of the thyratron are adjusted to equal the critical grid voltage of said thyratron tube.

8. A radiation level detector according to claim 6 wherein the magnitude of the combined radiation responsive and standard voltages is varied by the calibrated adjusting means.

9. A null detector measuring system comprising, a circuit producing an unknown voltage, a second circuit producing a standard voltage, electrical circuit means including a calibrated potentiometer to combine the voltages of the two circuits, a relaxation oscillator including a grid controlled gas tube, means to apply the output of the electrical circuit means to the grid-cathode circuit of said grid controlled gas tube and indicator means coupled to said relaxation oscillator circuit whereby the grid-cathode voltage may be kept at its critical value.

10. A self-contained portable radiation level detector for indicating when a predetermined level of radiation is exceeded comprising, a detector of radiant energy, means connected to the output of said detector for developing a voltage in response to detected radiations, a grid controlled relaxation oscillator connected to said means responsive to voltages developed in excess of said predetermined level of radiation, and means converting the oscillations of said oscillator into an audio tone indicative of said radiations.

11. A self-contained portable radiation detector comprising a radiant energy detector, integrating means including a potentiometer connected in the output circuit of said detector, a grid controlled relaxation oscillator connected across said detector and a predetermined portion of said potentiometer, said oscillator being in a normally quiescent state and oscillating when radiant energy is detected, means for adjusting the portion of said potentiometer shunted by said oscillator to quench oscillations in the presence of radiation and means for indicating the amount of adjustment required to render the oscillator quiescent.

References Cited in the file of this patent

UNITED STATES PATENTS

| | | |
|---|---|---|
| 1,921,869 | Ewald | Aug. 8, 1933 |
| 2,219,274 | Scherbatskoy | Oct. 22, 1940 |
| 2,496,886 | Molloy et al. | Feb. 7, 1950 |
| 2,507,324 | Taborsky | May 9, 1950 |
| 2,550,488 | Marsh | Apr. 24, 1951 |
| 2,596,500 | Molloy | May 13, 1952 |
| 2,601,583 | Ballou | June 24, 1952 |
| 2,609,512 | Conviser | Sept. 2, 1952 |
| 2,615,960 | Erwin | Oct. 28, 1952 |